(12) United States Patent
Ganev et al.

(10) Patent No.: US 8,315,071 B2
(45) Date of Patent: Nov. 20, 2012

(54) COMPOSITE 24-PULSE AC TO DC POWER CONVERTER HAVING A MAIN RECTIFIER AND MULTIPLE AUXILIARY RECTIFIERS

(75) Inventors: Evgeni Ganev, Torrance, CA (US); William Warr, Glendale, CA (US); Cuong Nguyen, Redondo Beach, CA (US)

(73) Assignee: Honeywell International Inc., Morristown, NJ (US)

( * ) Notice: Subject to any disclaimer, the term of this patent is extended or adjusted under 35 U.S.C. 154(b) by 172 days.

(21) Appl. No.: 12/611,752

(22) Filed: Nov. 3, 2009

(65) Prior Publication Data

US 2011/0103113 A1    May 5, 2011

(51) Int. Cl.
*H02M 7/515* (2007.01)
(52) U.S. Cl. .................. 363/5; 363/64; 363/67; 363/126
(58) Field of Classification Search .................. 363/44, 363/48, 125, 126
See application file for complete search history.

(56) References Cited

U.S. PATENT DOCUMENTS

| | | | |
|---|---|---|---|
| 4,876,634 A | 10/1989 | Paice | |
| 6,396,723 B2 | 5/2002 | Mochikawa et al. | |
| 6,650,557 B2 * | 11/2003 | Ferens et al. | 363/126 |
| 6,861,936 B2 * | 3/2005 | Kamath | 336/148 |
| 2002/0015320 A1 * | 2/2002 | Mochikawa et al. | 363/125 |
| 2008/0094020 A1 * | 4/2008 | Garlow et al. | 318/611 |
| 2009/0251932 A1 * | 10/2009 | Owen | 363/44 |
| 2009/0251935 A1 * | 10/2009 | Kleinecke et al. | 363/125 |
| 2010/0026089 A1 * | 2/2010 | Anghel et al. | 307/9.1 |

FOREIGN PATENT DOCUMENTS

| | | |
|---|---|---|
| DE | 101 28 152 | 12/2002 |
| GB | 2 433 653 | 6/2007 |
| WO | WO2008049886 | * 5/2008 |

OTHER PUBLICATIONS

EP search report—Mar. 24, 2011, applic. No. 10180477-1242.
Choi S. et al., Autotransformer Configurations to Enhance Utility Power quality of High Power AC/DC Rectifier Systems, IEEE, 1996.
Singh B. & Gairola S., (2008) "Star-Connected Autotransformer-Based Full-Wave AC-DC Converters," *International Journal of Emerging Electric Power Systems*: vol. 9 : Iss. 5, Article 1.

* cited by examiner

*Primary Examiner* — Gary L Laxton
*Assistant Examiner* — Gustavo Rosario Benitez
(74) *Attorney, Agent, or Firm* — Shimokaji & Assoc., PC (57) ABSTRACT

A 24-pulse composite AC-to-DC converter is a converter using two or more conversion methods in parallel. The converter may include a main rectifier receiving at least a portion of an input AC signal, an autotransformer having an output voltage with lower amplitude than the input AC signal, and a plurality of auxiliary bridge rectifiers, each receiving the output from each leg of the autotransformer. In one embodiment of the invention, the main rectifier may receive a substantial portion of the load current, allowing each of the auxiliary bridge rectifiers to be generally smaller than the main rectifier.

15 Claims, 10 Drawing Sheets

COMPOSITE 24-PULSE AC TO DC POWER CONVERTER HAVING A MAIN RECTIFIER AND MULTIPLE AUXILIARY RECTIFIERS

BACKGROUND OF THE INVENTION

The present invention relates to apparatus and methods for an electric power alternate current (AC)-to-direct current (DC) converter employing composite technology and, more particularly, to apparatus and methods for an electric power AC-to-DC converter utilizing more than one type of conversion technology operating in parallel.

AC-to-DC converters play a significant role in the modern aerospace/military industry. This is particularly true in the area of more electric architecture (MEA) for aircraft and spacecraft.

The commercial aircraft business is moving toward MEA having no bleed-air environmental control systems (ECS), variable-frequency (VF) power distribution systems, and electrical actuation. A typical example is the Boeing 787 platform. The Airbus A350 airplane incorporates a large number of MEA elements. In the future, the next-generation Boeing airplane (replacement for the 737) and the Airbus airplane (replacement for the A320), will most likely use MEA. Some military aircraft already utilize MEA for primary and secondary flight control among other functions.

Military ground vehicles have migrated toward hybrid electric technology, where the main propulsion is performed by electric drives. Therefore, substantial demand for increased power electronics in that area has emerged. Future space vehicles will require electric power-generation systems for thrust vector and flight control actuation. These systems must be more robust and offer greatly reduced operating costs and safety compared to the existing Space Shuttle power systems.

These new aerospace and military trends have significantly increased electrical power-generation needs. The overall result has been a significant increase in the challenges to accommodate electrical equipment to the new platforms. A new set of electrical power quality and electromagnetic interference (EMI) requirements has been created to satisfy system quality and performance.

The latest tendency, as a part of MEA, is the energy-efficient aircraft where electric power and heat management are inter-related. Therefore, overall system performance improvement and specifically power density increase are necessary for the new-generation hardware. This has led to increased operating voltages, and efforts to reduce system losses, weight, and volume. This particularly applies to the AC-to-DC conversion, which is a substantial contributor to the weight, volume, and cost of the power conversion electronics.

Power quality is a major concern for MEA aircraft because a large number of electric power systems and equipment are installed on the same bus. The power quality of these systems and equipment has much more stringent requirements to ensure that all power supplies/utilization equipment function properly together. For power supply equipment, additional monitoring features are implemented to detect and isolate equipment, or groups of equipment, that may experience a power quality issue. This isolation capability is to protect the other operating power supplies and utilization equipment.

For power utilization equipment, strict power quality requirements are imposed. Some reasons for the requirements are listed below:
Equipment contributing to power quality problems causes other equipment to fail.
Equipment is prevented from achieving its design performance or reliability due to the reduced power quality of the source.
Perhaps to meet a desired minimum weight, equipment designed with reduced or no power margin tends to be more susceptible to power quality issues. Also, equipment designed to minimize weight tends to create power quality issues.
Equipment can fail due to self-generated power quality problems.

Power quality requirements for AC electrical equipment consist of a large number of parameters. Some of these are listed below:
Current distortion
Inrush current
Voltage distortion
Voltage modulation
Power factor
Phase balance
DC content Current distortions composed of AC harmonics are the key design drivers for equipment. The requirements for current harmonics, subharmonics, and interharmonics specify the allowable distortion as a function of multiples of the fundamental frequency of the input voltage. A typical current harmonic spectrum of an AC to DC converter includes all odd harmonics up to 39, with limits ranging from 10 to 0.25 percent of the maximum current fundamental. The current distortion requirement is a key design driver since it usually significantly impacts the equipment weight. Current distortion also is specified as a function of the equipment-rated power because the higher power equipment has more influence on the power bus.

For AC-to-DC converters, the requirements for the DC output are also important. The requirements include ripple voltage and voltage droop. The ripple voltage and voltage droop determine the DC operating range of the output equipment such as inverters.

When converting three-phase AC to DC, the most typical method is to employ a single three-phase full-wave rectifier in which six rectifying elements are connected in a bridge configuration. In such a three-phase full-wave rectifier, DC voltage is output by changing over the rectifying elements so that they successively conduct at intervals of 60°. However, with this method, the rectified DC voltage contains a voltage ripple of large amplitude having a period of six times the power source frequency, producing harmonics.

As can be seen, there is a need for an improved AC-to-DC converter that may provide sufficient power density while not substantially adding to the weight, volume and cost of the power conversion electronics.

SUMMARY OF THE INVENTION

In one aspect of the present invention, a composite 24-pulse AC-to-DC converter comprises a main rectifier receiving at least a portion of an input AC waveform; an autotransformer having output voltages with lower amplitude than the input AC waveform; and a plurality of auxiliary bridge rectifiers, each receiving the output from each leg of the autotransformer, each being generally smaller than the main rectifier.

In another aspect of the present invention, a method for converting AC power to DC power with a 24-pulse AC-to-DC converter comprises passing a first portion of a load current through a main rectifier; passing a second portion of a load current though an autotransformer, the autotransformer having an output voltage with lower amplitude than an input AC waveform; and rectifying the output from the autotransformer with a plurality of auxiliary bridge rectifiers, each of the auxiliary bridge rectifiers receiving the output from each leg of the autotransformer.

In a further aspect of the present invention, a method for reducing the total harmonic distortion (THD) of a 24-pulse AC-to-DC converter comprises passing a substantial portion of a load current through a main rectifier; passing the remaining portion of the load current though an autotransformer, the autotransformer having an output voltage with lower amplitude than an input AC waveform; and rectifying the output from the autotransformer with a plurality of auxiliary bridge rectifiers, each of the auxiliary bridge rectifiers receiving the output from each leg of the autotransformer, and each of the auxiliary bridge rectifiers are generally smaller than the main rectifier.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features.

Broadly, embodiments of the present invention provide a 24-pulse composite AC-to-DC converter. The term "composite AC-to-DC converter" has been coined to distinguish a converter using two or more conversion methods in parallel. All the autotransformers used in these composite systems may satisfy a transformer vector diagram constructed using the vertices of an equilateral-triangle and an arc swung between them equal to the length of one of the triangle's legs. The number of autotransformer phase outputs may then be determined by the number of equally spaced rays drawn from the opposite vertex of the equilateral triangle. The intersection points of these rays with the arc may be used to design the autotransformer's windings voltage ratios and interconnections. An autotransformer designed this way may have output voltages of lower amplitude than the voltage source, while the voltage source amplitude alone may define the system's DC output level. Because of the voltage differences, the load current may split into two paths. A large portion of the load current may be rectified directly through a main rectifier bridge. The remainder of the load current may flow through the autotransformer and may be rectified by auxiliary bridge rectifiers.

The composite AC-to-DC converter according to the present invention may reduce autotransformer size and weight and should greatly improve the rectification system efficiency. In addition to reduction of size and weight, a need exists for an AC-to-DC conversion method that minimizes the AC input total harmonic distortion (THD). Six-pulse rectification schemes produce predictable harmonics as formulated in Equation 1:

$$F(h)=(k*q+/-1)*f1 \qquad (1)$$

where:
F(h) is the characteristic harmonic;
k is an integer beginning with 1;
q is an integer representing the number of commutations/cycle; and
f1 is the fundamental frequency.

The characteristic current harmonics of a six-pulse rectification system include the $5^{th}$, $7_{th}$, $11^{th}$, $13^{th}$, $17^{th}$, $19^{th}$, and $23^{rd}$ of the fundamental. These harmonics have considerable magnitude and for the six-pulse system can exceed 33 percent of the fundamental. Theory predicts that going to higher pulse rectifier systems will reduce a system's current THD. For example, a 12-pulse rectifier may have about 8.5 percent current THD (no harmonic below the $11^{th}$), an 18-pulse rectifier may have about 3 percent current THD (no harmonic below the $17^{th}$), and a 24-pulse rectifier may have about 1.5 percent current THD (no harmonic below the $23^{rd}$).

Autotransformer conversion ratio (ACR) is used as means to compare different autotransformers. Equation 2 has been used as a basis of comparison of autotransformer size and weight.

$$ACR=\Sigma(Vrms*Irms)/IDCout*VDCout \qquad (2)$$

where
Vrms are the voltages at each individual winding in volt-rms values;
Irms are the currents in each individual winding in amps-rms values;
VDC out is the output rectified voltage in volts; and
IDC out is the output rectified current in amps.
The unit of the ACR is VA/W.

Using this equation a typical autotransformer used in various conventional converter designs has an ACR of 0.6545 VA/W. The estimated ACR for the smallest 18-pulse autotransformer from U.S. Pat. No. 6,396,723 is 0.2835 VA/W. The estimated equivalent ACR for the 24-pulse autotransformer according to an embodiment of the present invention is 0.2748 VA/W. The 24-pulse autotransformer from this estimate is potentially only 0.42 the size and weight of the autotransformer presently used in several conventional designs.

Figure 1:
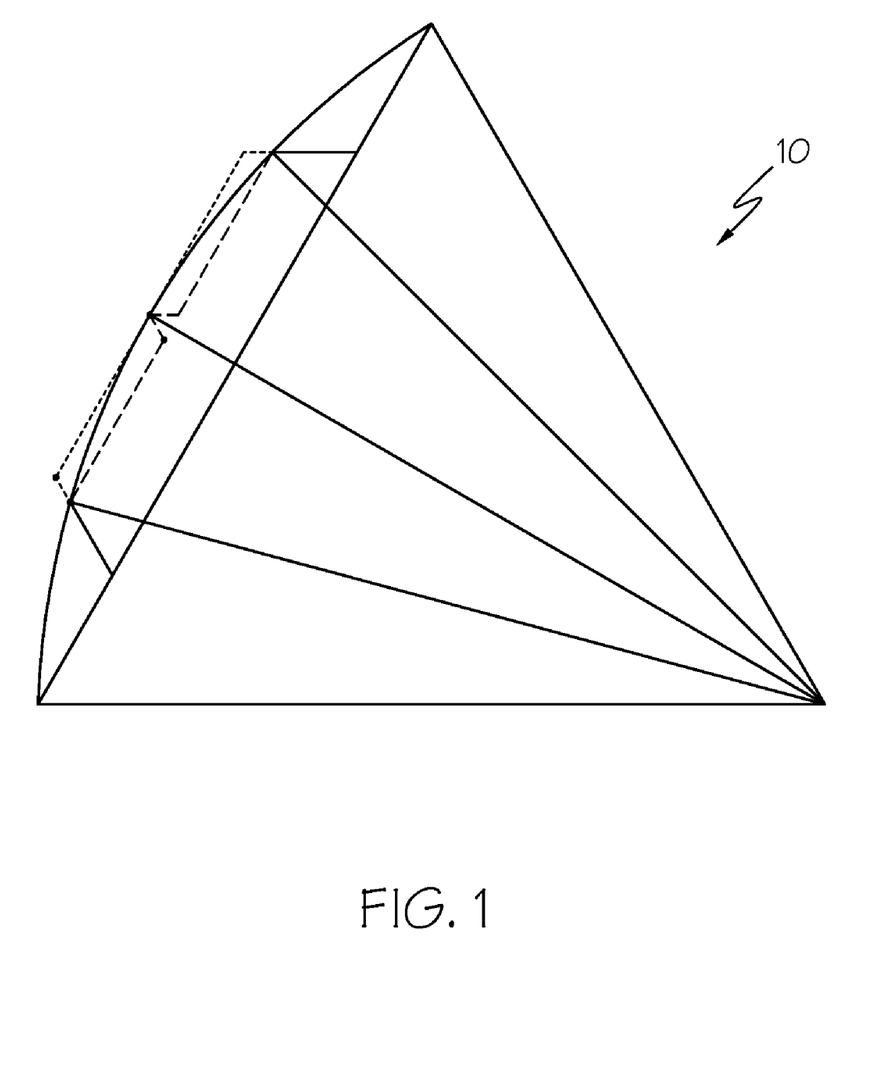
FIG. 1 is one leg of a construction diagram for the 24-pulse autotransformer according to an embodiment of the present invention.

Referring to FIG. 1, there is shown one leg of a construction diagram 10 for the 24-pulse autotransformer according to an embodiment of the present invention. Many other vector combinations exist that may achieve the coordinates of intersection of the three rays and arc needed for a 24-pulse configuration. Two of these vector configurations are herein described. Of these two configurations, one may minimize winding interconnections and also give a more efficient design.

Figure 2:
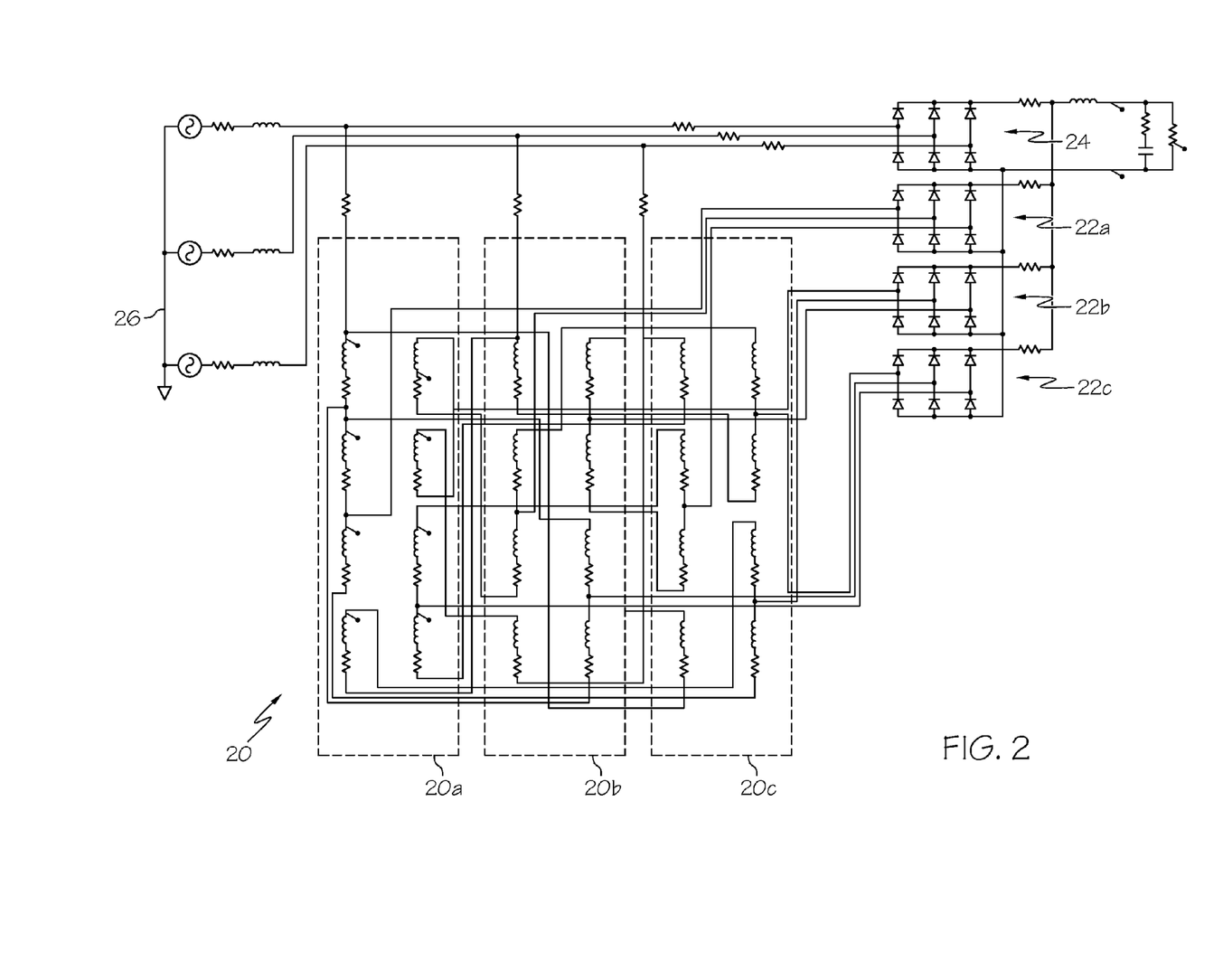
FIG. 2 is a circuit of a simulation of the 24-pulse AC-to-DC converter according to an embodiment of the present invention, supplying a 10 kW resistive load.

A simulation of this 24-pulse AC-to-DC converter representing this configuration is shown in FIG. 2, supplying a 10 kW resistive load. The windings associated with each of the three-phase autotransformer legs are grouped within dashed-line rectangles 20a, 20b, 20c. The output from each of the autotransformer legs 20a, 20b, 20c may pass through auxiliary rectifiers 22a, 22b, 22c. As discussed above, an input AC waveform 26 may be split with a substantial portion of load current being rectified through a main 6-diode rectifier bridge 24 and the remaining portion of load current flowing through an autotransformer 20 to be rectified by the auxiliary bridge rectifiers 22a, 22b, 22c.

Figure 3:
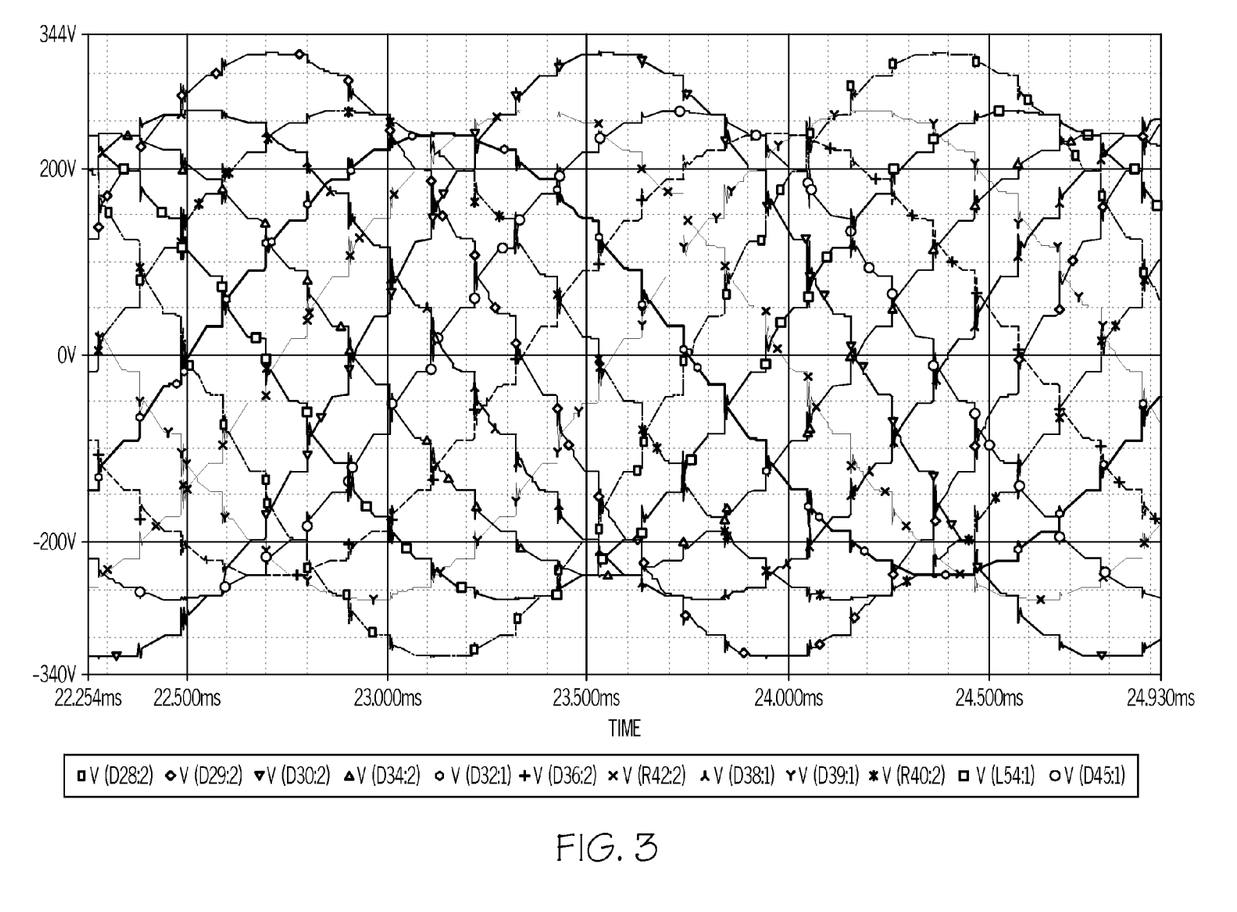
FIG. 3 is a graph of voltage waveforms when performing the simulation of FIG. 2.

Performing the simulation in PSpice yielded the waveforms and system measurements shown in FIG. 3. The voltages to the four three-phase rectifiers show the system output characteristic with reduced voltage amplitudes at the transformer (V(D34:2), V(D32:1) and V(D36:2)), when compared to the source input (V(D28:2), V(D29:2) and V(D30:2)). This voltage characteristic may cause the source current to split between a main rectifier and the auxiliary rectifiers supplied by the autotransformer.

Figure 4:
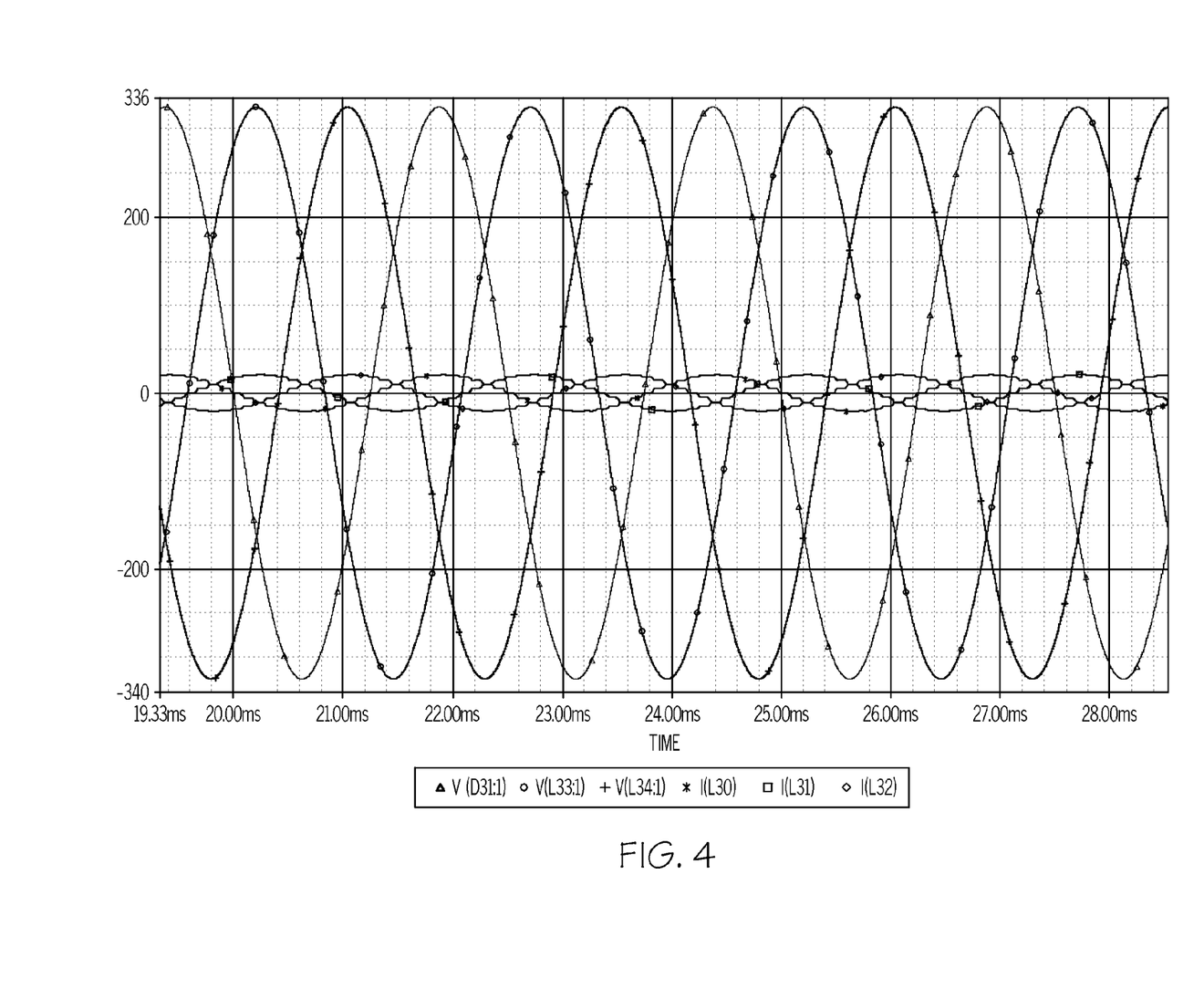
FIG. 4 is a graph showing the input voltage and current waveforms used in the simulation of FIG. 2.

The source voltages and currents may show nearly unity power factor. Like all rectifier systems, the power factor will depend on additional input filters and system loading, as shown in FIG. 4.

Figure 5:
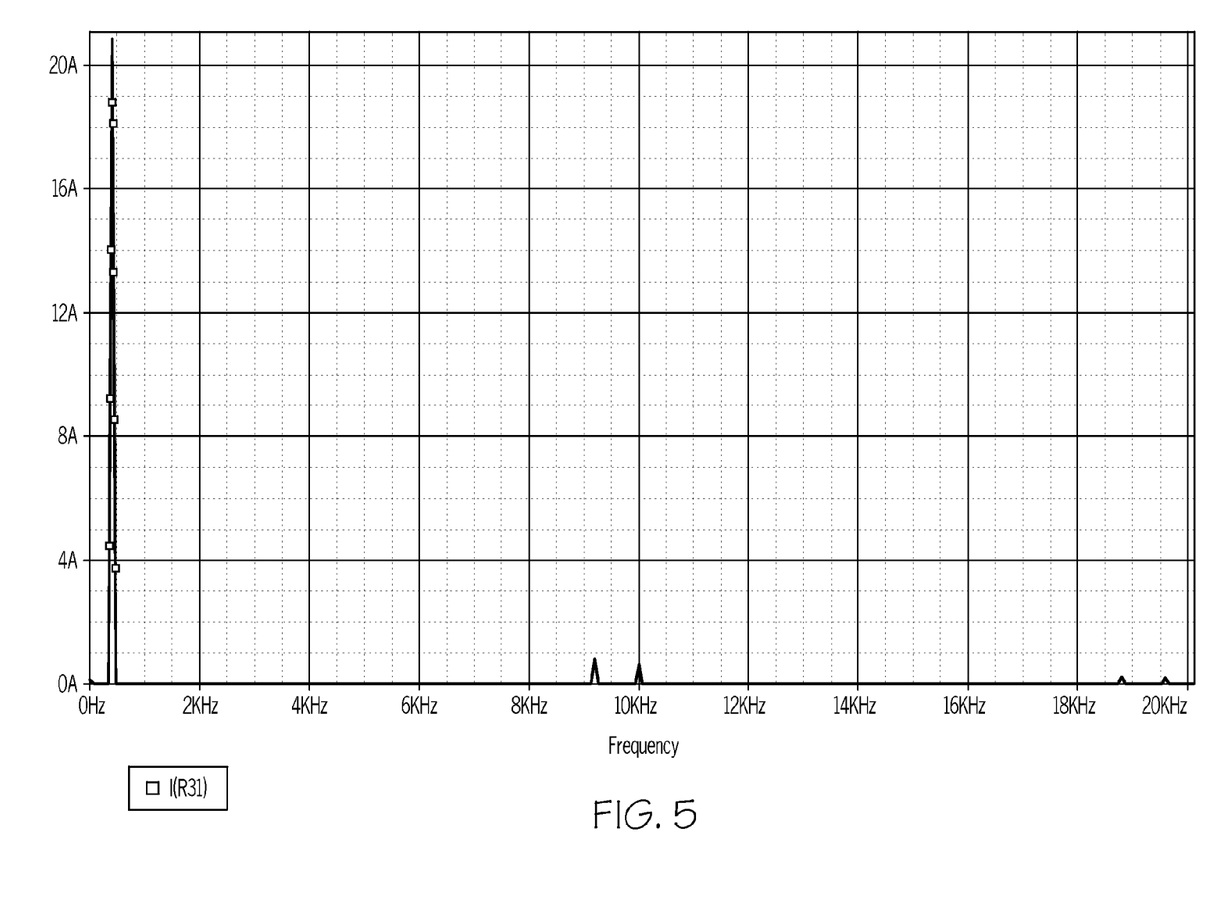
FIG. 5 is a graph showing a Fast-Fourier Transform (FFT) of the current input waveform (400 Hz fundamental) of FIG. 4.

FIG. 5 is a Fast-Fourier Transform (FFT) of the current waveform (400 Hz fundamental). The $23^{rd}$ harmonic at 9.2 kHz can be seen in FIG. 5.

Figure 6:
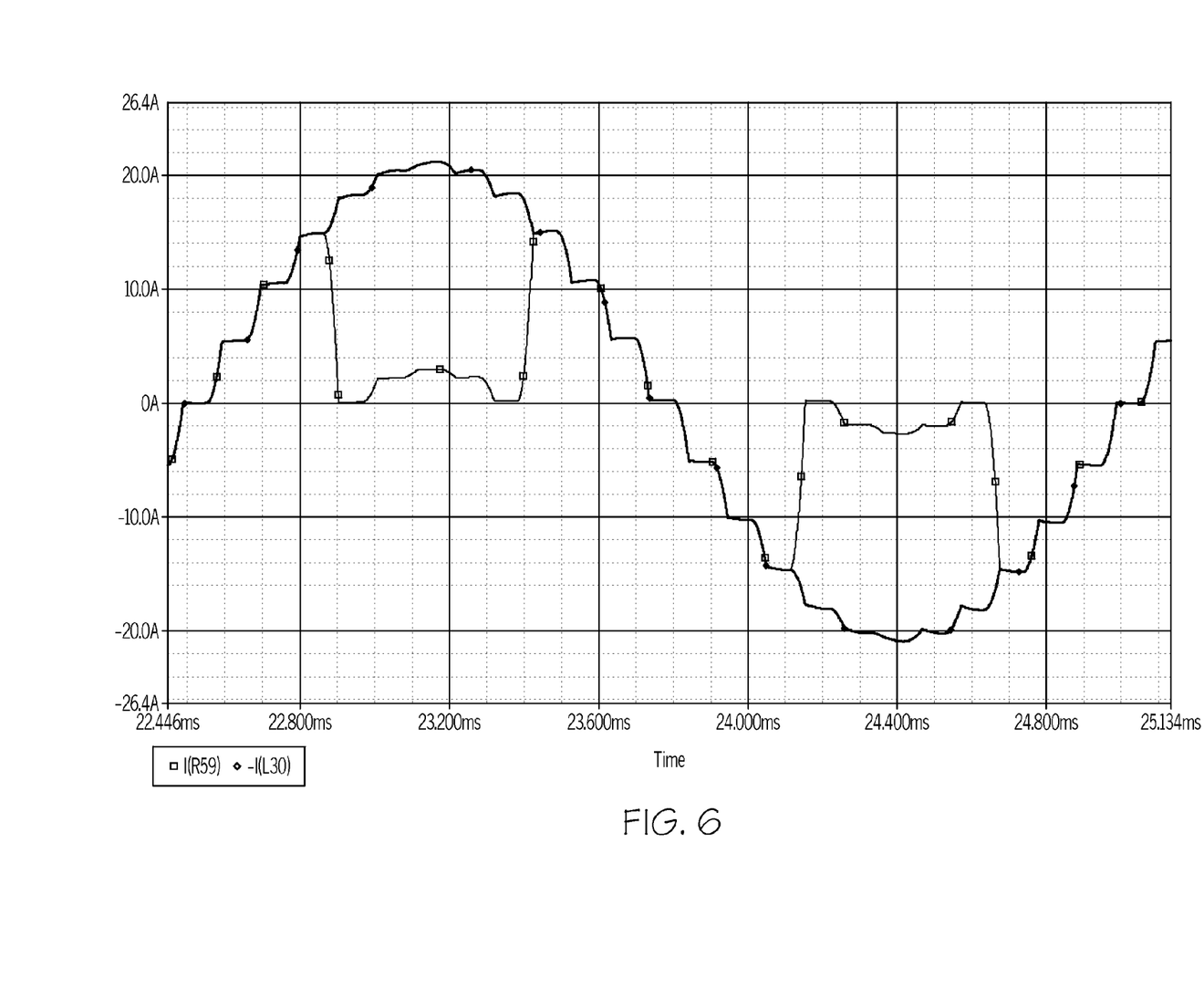
FIG. 6 is a graph showing the total input current and the current to the autotransformer during the simulation of FIG. 2.

As seen in FIG. 6, the input phase current that is directed to the auto transformer may be a fraction of the total current. The significance of this aspect of the present invention is that the autotransformer may have less loss than one that carries all the input phase current.

Figure 7:
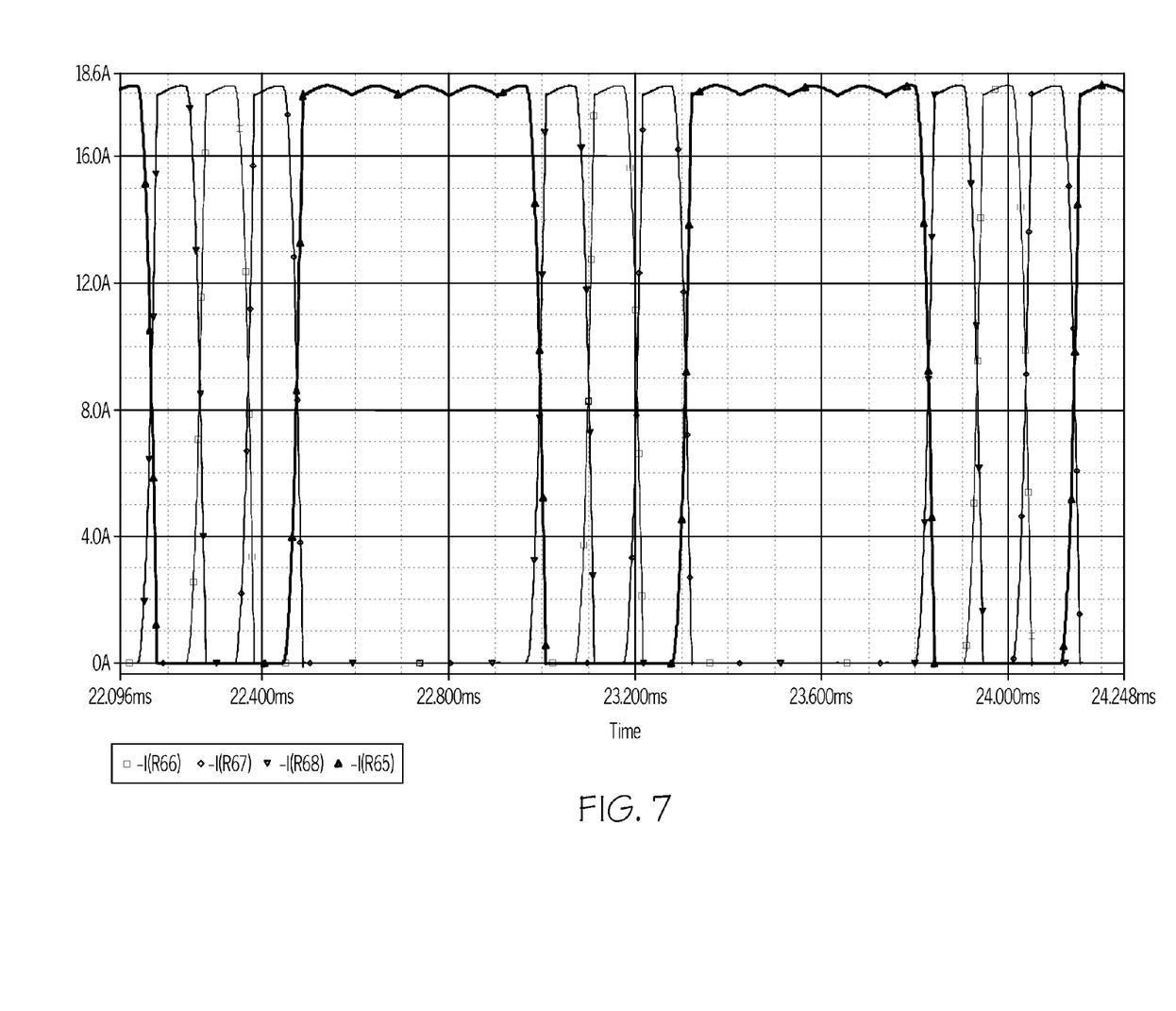
FIG. 7 is a graph showing the current waveforms of all rectifier outputs during the simulation of FIG. 2.

Rectifier current contributions to a 10 kW resistive load demonstrate the current division between main and auxiliary rectifiers within the composite AC/DC converter. Because the auxiliary rectifiers may experience lower RMS current, with respect to the main rectifier, they may be smaller devices than those used for the main rectifier.

Figure 8:
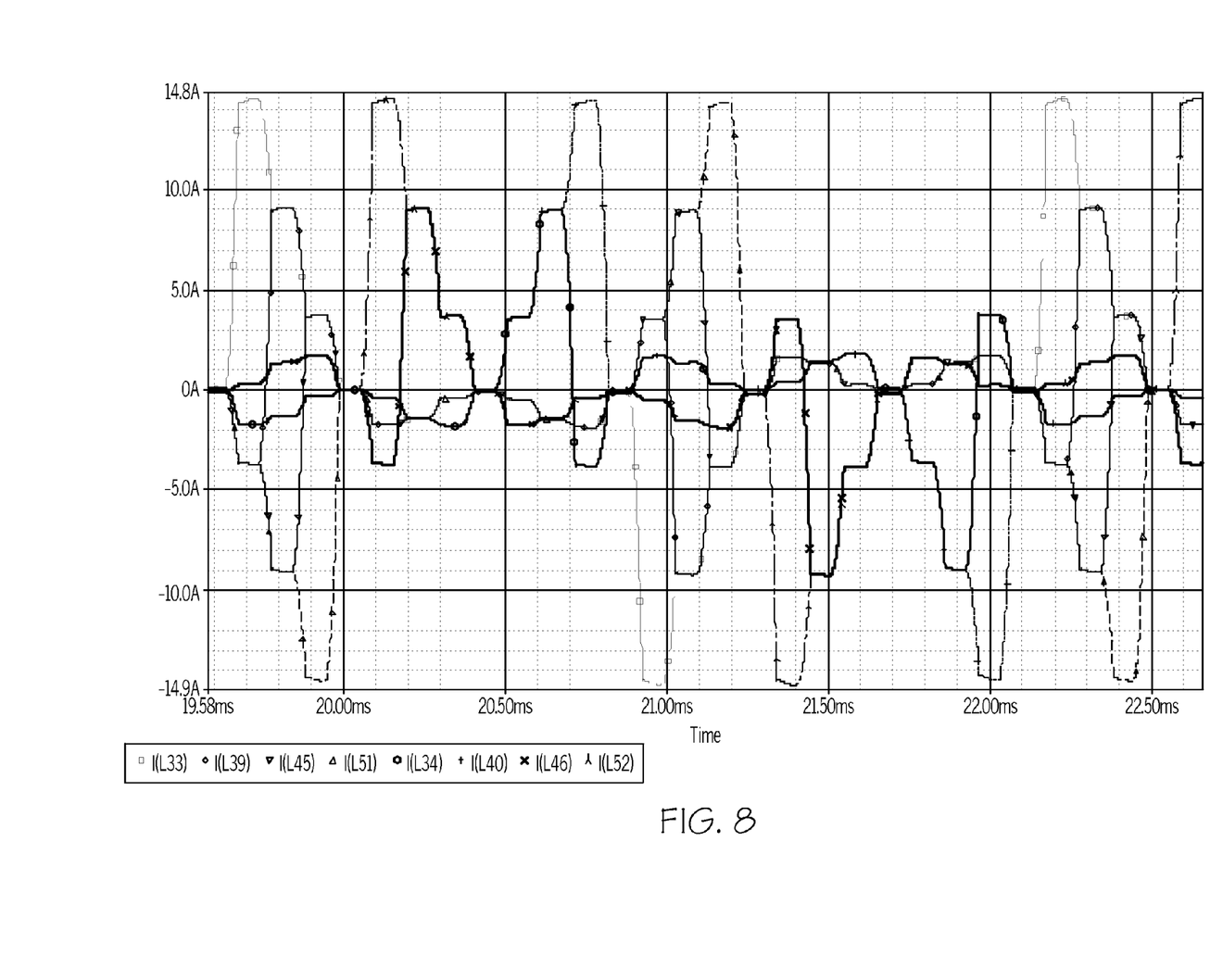
FIG. 8 is a graph showing the currents within the windings of one autotransformer leg during the simulation of FIG. 2.

Referring to FIG. 8, the various currents within the various windings of one transformer leg are shown. The various currents may each have one of two different RMS values.

Figure 9:
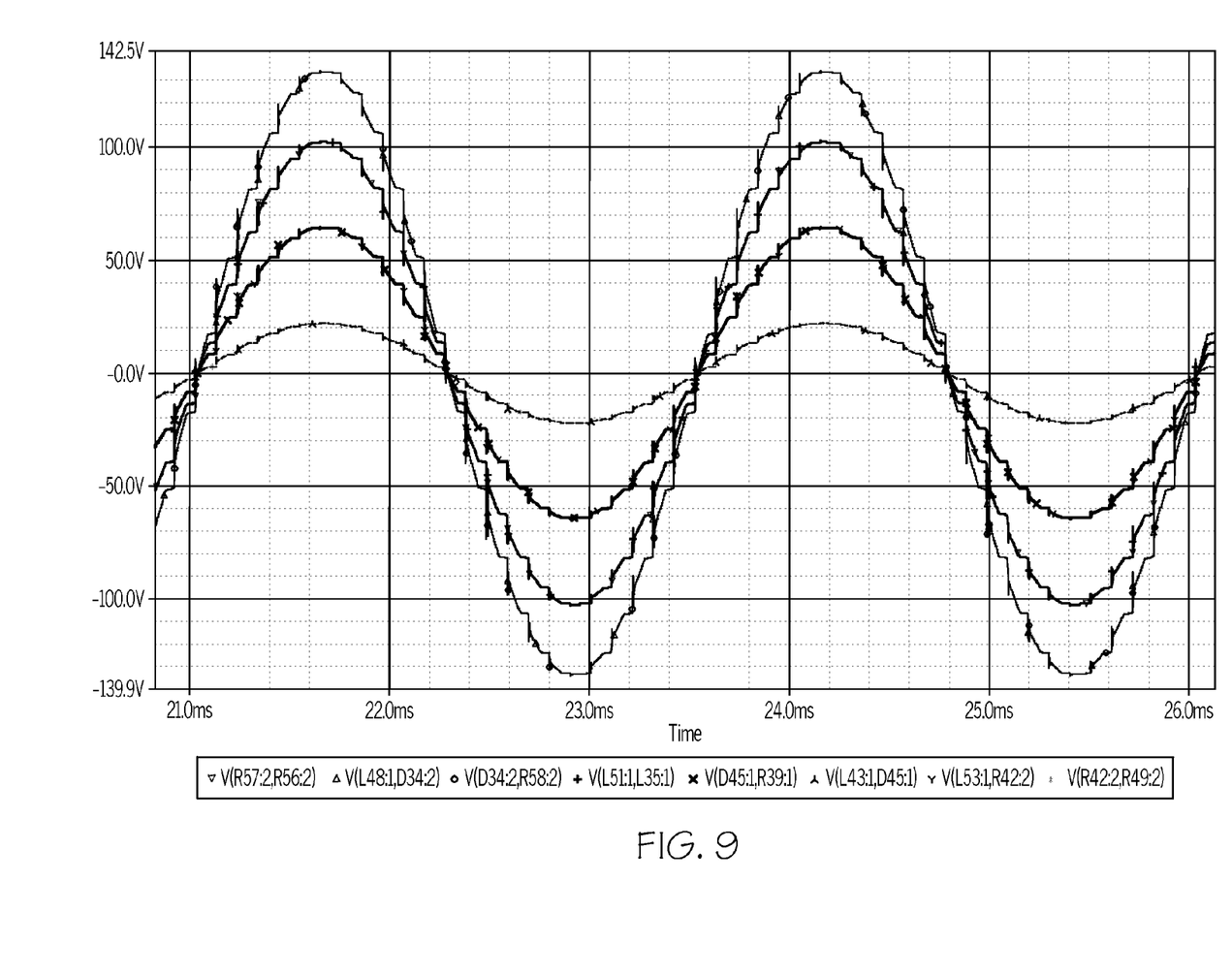
FIG. 9 is a graph showing the voltages within the windings of one autotransformer leg during the simulation of FIG. 2.

The voltage across the various windings of one transformer leg is shown in FIG. 9. There are four different RMS values.

Figure 10:
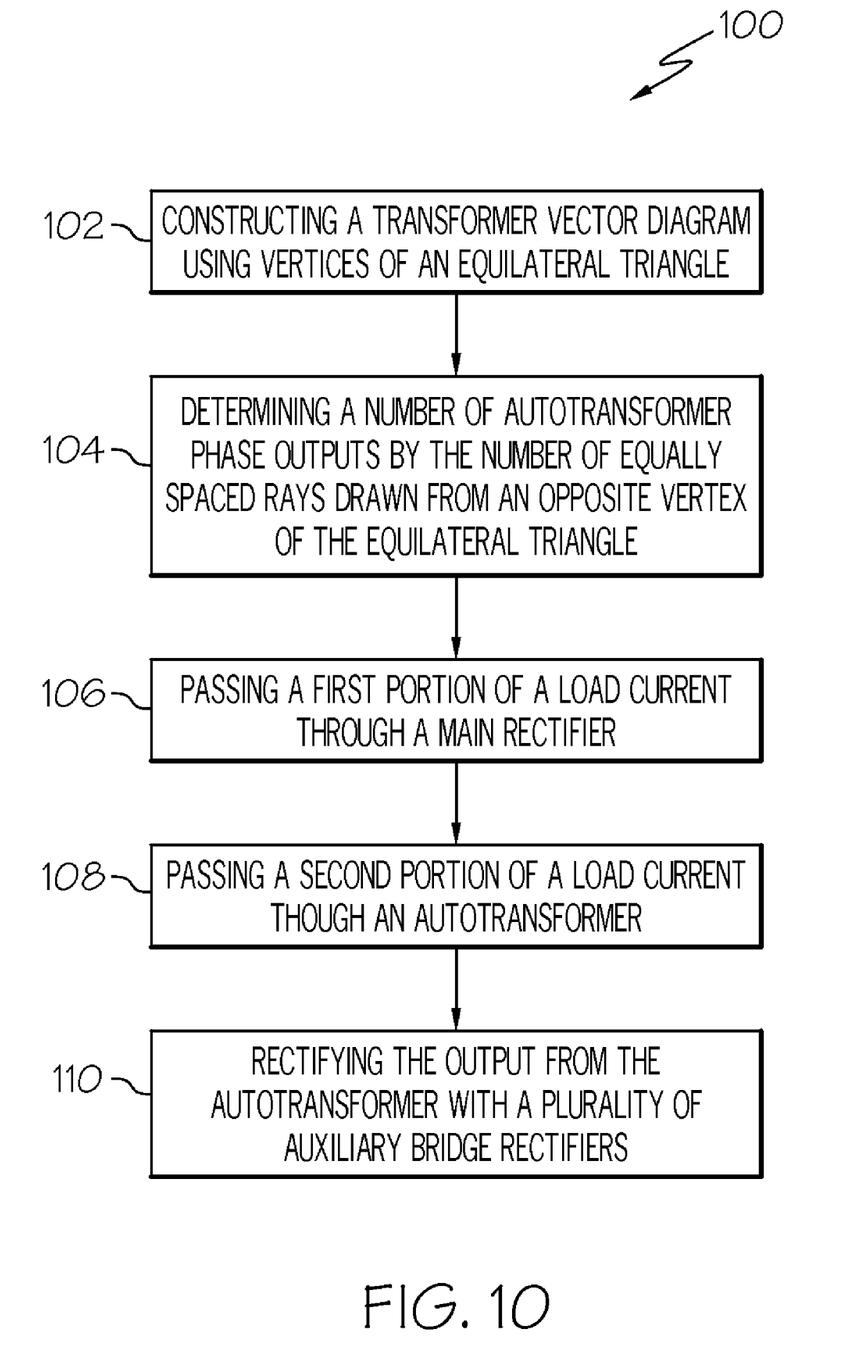
FIG. 10 is a flow chart describing a method according to an embodiment of the present invention.

Referring to FIG. 10, there is shown a flow chart describing a method 100 for converting AC power to DC power with a 24-pulse AC-to-DC converter. The method may include an initial step of configuring a transformer. This step may include a step 102 of constructing a transformer vector diagram using vertices of an equilateral triangle wherein an arc swung between the vertices is equal to a length of one of the triangle's legs and a further step 104 of determining a number of autotransformer phase outputs by the number of equally spaced rays drawn from an opposite vertex of the equilateral triangle. Once the configuration of the autotransformer is determined, the method 100 may include a step 106 of passing a first portion of a load current through a main rectifier and a step 108 of passing a second portion of a load current though an autotransformer. As discussed above, the autotransformer may have an output voltage with lower amplitude than an input AC signal. The method 100 may further include a step 110 of rectifying the output from the autotransformer with a plurality of auxiliary bridge rectifiers. Each of these auxiliary bridge rectifiers may receive the output from each leg of the autotransformer.

It should be understood, of course, that the foregoing relates to exemplary embodiments of the invention and that modifications may be made without departing from the spirit and scope of the invention as set forth in the following claims.

We claim:

1. A light-weight composite 24-pulse AC-to-DC converter with optimal power quality comprising:
   a main rectifier connected directly to receive a three phase input AC waveform, the direct connection being formed by phase conductors interposed between a source of the input AC waveform and the main rectifier;
   an autotransformer comprising;
      three separate inputs, each input being connected to only one of the phase conductors, and
      at least three sets of three phase outputs having output voltage with lower amplitude than the input AC waveform; and
   three auxiliary bridge rectifiers, each receiving one of the sets of three phase outputs of the autotransformer, each DC output from each auxiliary bridge rectifier connected together in parallel, wherein
   each output from the three auxiliary bridge rectifiers connected in parallel with an output of the main rectifier, and
   each leg of the autotransformer satisfies a transformer vector diagram constructed using vertices of an equilateral triangle wherein an arc swung between the vertices is equal to a length of one leg of the triangle.

2. The composite 24-pulse AC-to-DC converter according to claim 1 wherein the input AC waveform is split with a substantial portion of load current being rectified through the main rectifier and the remaining portion of load current flowing through the autotransformer to be rectified by the auxiliary bridge rectifiers.

3. The composite 24-pulse AC-to-DC converter according to claim 2, wherein a number of autotransformer phase outputs is determined by the number of equally spaced rays drawn from an opposite vertex of the equilateral triangle.

4. The composite 24-pulse AC-to-DC converter according to claim 1, wherein the output of the 24-pulse AC-to-DC converter has no harmonic below the $23^{rd}$ harmonic.

5. The composite 24-pulse AC-to-DC converter according to claim 1, wherein an estimated autotransformer conversion ratio is 0.2748 volt-amps per watt (VA/W).

6. A method for converting three phase AC power to DC power with a 24-pulse AC-to-DC converter, the method comprising:
   passing a first portion of a load current directly through a main rectifier through phase conductors interposed between an AC power source and the main rectifier;
   passing a second portion of a load current though an 18-pulse autotransformer through three separate inputs, each input being connected to only one of the phase conductors, the autotransformer having output voltages with lower amplitude than an input AC waveform; and
   rectifying outputs from the autotransformer with three auxiliary bridge rectifiers, each of the auxiliary bridge rectifiers receiving an output from each leg of the autotransformer, wherein outputs of each of the auxiliary bridge rectifiers are connected in parallel to an output of the main rectifier, and each leg of the autotransformer satisfies a transformer vector diagram constructed using vertices of an equilateral triangle wherein an arc swung between the vertices is equal to a length of one leg of the triangle and a number of autotransformer phase outputs is determined by a number of rays drawn from an opposite vertex of the equilateral triangle that are equally spaced between two equilateral legs of the triangle and each ray extends from the opposite vertex to a point along the arc.

7. The method of claim 6, wherein voltages and currents of the AC input waveform show nearly unity power factor.

8. The method of claim 6, further comprising minimizing loss from the autotransformer by providing, to the autotransformer, the second portion which is a fraction of the total AC input power.

9. The method of claim 8, wherein the first portion is a larger portion of the load current and the second portion is the remaining portion of the load current.

10. The method of claim 9, wherein each of the auxiliary bridge rectifiers has a lower current rating than the main rectifier.

11. A 24-pulse AC-to-DC converter method for reducing the total harmonic distortion (THD), the method comprising:

passing a substantial portion of a load current directly through a main rectifier through phase conductors interposed between an AC power source and the main rectifier;

passing the remaining portion of a load current though an 18-pulse autotransformer, through separate inputs, each input being connected to only one of the phase conductors, the autotransformer comprising a number of phase outputs determined by a number of rays in a vector diagram comprising an equilateral triangle and an arc swung between two vertices, the rays equally spaced between two equilateral legs, each ray extending from a vertex to a point along the arc and the autotransformer having an output voltage with lower amplitude than an input AC waveform, said number being at least equal to a number of phases of the AC power source; and rectifying the output from the autotransformer with a plurality of auxiliary bridge rectifiers, each of the auxiliary bridge rectifiers receiving one of the phase outputs, and each of the auxiliary bridge rectifiers including a DC output connected in parallel with a DC output of the main rectifier.

12. The method of claim 11, wherein the 24-pulse AC-to-DC converter has about 1.5 percent current THD.

13. The method of claim 11, wherein the output of the 24-pulse AC-to-DC converter has no harmonic below the $23^{rd}$ harmonic.

14. The method of claim 11, wherein the input AC waveform has a variable frequency between 360 Hz and 800 Hz.

15. The method of claim 6, wherein the input AC waveform has a variable frequency between 360 Hz and 800 Hz.

* * * * *